3,440,060
CHEWING GUMS

Howard M. Rife, Charleston, and Leolin V. Landers, South Charleston, W. Va., assignors to Union Carbide Corporation, a corporation of New York
No Drawing. Continuation-in-part of application Ser. No. 204,068, June 21, 1962. This application Dec. 23, 1965, Ser. No. 516,088
Int. Cl. A23g *3/00*
U.S. Cl. 99—135            7 Claims The present application is a continuation-in-part of application Ser. No. 204,068, filed June 21, 1962, now abandoned.

This invention relates to chewing gums. More particularly, this invention relates to copolymers of vinyl acetate and ethylene and terpolymers of vinyl acetate, ethylene and vinyl esters of long-chain fatty acids, both of which have improved properties and are especially desirable for use as chewing gum bases.

Chicle and other similar natural gums are well-known as materials which are suitable for use as chewing gum bases. In recent years, however, these natural gums have not been available in amounts necessary to completely satisfy the needs of the chewing gum industry. Furthermore, chicle and other similar natural gums are relatively expensive and, in addition, are somewhat tacky. Chewing gums in which chicle and other similar natural gums have been used as the base material have shown an undesirable tendency of excessively sticking to the teeth of the chewer.

In an effort to replace chicle and other such natural gums, various synthetic polymers have been developed and proposed for use as chewing gum bases. An illustration of one such polymer is polyvinyl acetate. Polyvinyl acetate and other like polymers, however, have been found to excessively stick to the teeth of the chewer.

Attempts to overcome this "excessive sticking" tendency have been unsuccessful since expedients proposed for overcoming this problem have given rise to other and perhaps more serious problems. For instance, it has been proposed to add sulfur to polyvinyl acetate for the purpose of rendering the chewing gum in which it is used as the base material less sticky. The addition of sulfur to polyvinyl acetate has proven to be undesirable as the sulfur, in the resultant composition, reacts with the iron surfaces of the equipment used to manufacture chewing gum therefrom to form ferric sulfide. Ferric sulfide contaminates the chewing gum during the manufacturing operation.

Another expedient which has been proposed in order to eliminate the tendency of chewing gums, containing polyvinyl acetate and other like polymers as a base, of excessively sticking to the teeth of the chewer, is the incorporation of a mineral filler such as $CaCO_3$ in the polymer prior to its being formed into a chewing gum. Mineral fillers, however, often separate out of the gum as the gum is being chewed, leaving a gritty taste in the mouth.

Also, chewing gums containing polyvinyl acetate and other such polymers are relatively hard to chew. Consequently, it has been necessary to use relatively large amounts of natural gums, such as chicle, along with these polymers in order to formulate gums which are readily "chewable."

The present invention provides for polymers which are non-toxic, tasteless, odorless, significantly more flexible, elastomeric and readily hydrated than synthetic polymers previously utilized as chewing gum bases. The polymers of the present invention, in admixture with the usual flavoring and sweetening agents and without the addition thereto of chicle and other natural gums, can be easily compounded into chewing gums which are relatively easy to masticate and have less tendency of sticking to the teeth of the chewer than chewing gums which are currently available.

The polymers of the present invention comprise (1) a copolymer of vinyl acetate and ethylene and (2) a terpolymer of vinyl acetate, ethylene and a vinyl ester of a long-chain fatty acid having the formula:

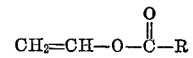

wherein R is a monovalent hydrocarbon radical containing from 8 to 22 carbon atoms inclusive.

The copolymers of vinyl acetate and ethylene of the present invention contain from about 1 to about 40 percent by weight combined ethylene, generally from about 1 to about 20 percent by weight combined ethylene and preferably from about 2 to about 10 percent by weight combined ethylene, based on the weight of the copolymer, with the remainder being combined vinyl acetate; have a grade of from about 1.2 to about 20, generally from about 1.2 to about 2.0 and preferably from about 1.5 to about 1.6; have an intrinsic viscosity of from about 0.05 to about 0.75, generally from about 0.05 to about 0.25 and preferably from about 0.065 to about 0.125 and have of plasticity of from about 0.03 to about 2.7, generally from about 0.05 to about 2.5 and preferably from about 1.0 to 2.0.

The terpolymers of vinyl acetate, ethylene and vinyl ester of a long-chain fatty acid contain from about 1 to about 15 percent by weight combined vinyl ester of a long-chain fatty acid, preferably from about 3 to about 7 percent by weight combined vinyl ester, based on the weight of the terpolymer; contain from about 1 to about 40 percent by weight combined ethylene, generally from about 1 to about 20 percent by weight combined ethylene and preferably from about 2 to about 10 percent by weight combined ethylene, based on the weight of the terpolymer; with the remainder of the terpolymer being combined vinyl acetate and have the physical properties as defined above for the copolymers of vinyl acetate and ethylene.

Copolymers of vinyl acetate and ethylene, and terpolymers of vinyl acetate, ethylene and a vinyl ester of a long-chain fatty acid having the properties enumerated above, as stated, are excellently suited for use as chewing gum bases. It has also been found that the polymers, as previously defined, which can be further defined physically as having a melt viscosity of from about 500 to 650 at 65° C. to about 650 to 800 at 90° C., preferably from about 550 to 600 at 65° C. to about 700 to 750 at 90° C., and a melt index of from about 3 to about 150, preferably from about 6 to about 132, are especially suited for use as chewing gum bases.

Suitable vinyl esters of long-chain fatty acids for purposes of this invention are, inter alia, vinyl pelargonate, vinyl stearate, vinyl laurate, vinyl palmitate and the like.

The physical properties of the polymeric chewing gum bases of this invention are defined as:

Grade.—The viscosity in centipoise of a solution of the polymer in benzene at 20° C., 8.602 grams of polymer per 100 ml. of solution.

Intrinsic viscosity.—Reduced viscosity of the polymer in benzene at 20° C. at infinite dilution. Determination of intrinsic viscosity is described in a pamphlet published by Union Carbide Plastics Company, a division of Union Carbide Corporation, Jan. 22, 1960, entitled "Information Test Method, No. 23–262–10a."

Plasticity.—Height in millimeters of a 2.0 gram solid ball of polymer after 15 minutes of heating at 50° C. under a 5-kilogram load in a Williams Parallel Plate Plastometer.

Hydration time.—Time in minutes for complete mastication of a 2 gram sample of polymer by a person chewing at a normal rate, about 100 chews per minute. Complete mastication is evidenced by a white, opaque appearance of the polymer.

Melt viscosity.—Viscosity expressed in meter-grams per second using a Brabender Plastograph.

Melt index.—Viscosity expressed as decigram per minute at 85° C.

The preparation of both the copolymers and the terpolymers of this invention is conveniently accomplished using a suitable solvent wherein the monomers are admixed and react one with another to produce a polymer having the desired combined monomer content, grade, intrinsic viscosity and plasticity values. The amount of each monomer used in each instance will depend upon the desired combined monomer in the final product.

As stated, solution polymerization techniques are preferred for purposes of preparing the polymers of the present invention. Illustrative of solvents which provide a suitable reaction medium are esters of lower carboxylic acids such as ethyl butyrate, ethyl acetate, butyl acetate and the like; halogen substituted saturated aliphatic hydrocarbons containing no more than 3 halogen substituents and generally no more than 2 carbon atoms such as ethylene dichloride, trichloroethane and the like; saturated aliphatic ketones containing preferably 3 to 8 carbon atoms inclusive, such as methyl ethyl ketone, ethyl butyl ketone, diethyl ketone, acetone and the like.

For purposes of preparing polymers of the present invention, acetone is the solvent most preferred. In those instances wherein acetone is used, it is employed in an amount of about 30 percent by weight to about 80 percent by weight based on the total weight of the reaction mixture.

The polymerization reaction which results in the production of the polymers of this invention is usually promoted by the use of an organic peroxide catalyst. The organic peroxide used should have a decomposition temperature such that it will decompose at the temperature at which the reaction is being conducted; its decomposition products should not interfere with the reaction and its decomposition products should be easily removable from the final product.

Suitable peroxides, among others, which have been found to be particularly desirable are isopropyl peroxydicarbonate, alkyl peroxides such as diisopropyl peroxide, 2,5-dimethyl-2,5-di(tertiary butylperoxy)hexane, tertiary butyl hydroperoxide, di-tert-butyl peroxide and the like; alkyl peroxy esters such as tertiary butyl perbenzoate and the like; diacyl peroxides such as acetyl peroxide, decanoyl peroxide, lauroyl peroxide and the like; diacyl aromatic peroxides such as benzoyl peroxide and the like.

The organic peroxide catalysts are generally employed in amounts of from about 0.05 percent by weight to about 0.50 percent by weight and preferably from about 0.10 percent by weight to about 0.20 percent by weight, based on the weight of the monomers charged.

Temperatures at which the polymerization reaction is conducted are generally on the order of about 60° C. to about 170° C. and preferably on the order of about 155° C. to about 160° C. The temperature employed in each instance will depend, in general, on the ratio, by weight, of monomers to solvent and on the particular organic peroxide used. For instance, using isopropyl peroxydicarbonate as the organic peroxide and with a 30 to 70 ratio, on a weight basis, of total monomer to acetone, a reaction temperature of about 60° C. can be employed.

In conducting the reaction, sufficient pressure is utilized to keep the reactants in the liquid phase. The reaction is conducted, generally, under autogenous pressure in the range of at least 100 p.s.i.g. However, pressures greatly in excess of 100 p.s.i.g. can be employed with excellent results.

Completion of the polymerization reaction, that is, the time that it takes to effect substantially complete conversion of monomer to polymer, is from about 10 to about 30 minutes.

Separation of the solvent, unreacted monomer and catalyst decomposition products from the polymer is conveniently effected by vacuum drying the reacted mixture in a suitably agitated vessel such as a twin-screw Marshall mill. Drying time, temperature and vacuum under which the drying operation is conducted will, of course, vary in each instance and depend, in part, upon the nature of the solvent, unreacted monomers and catalyst decomposition products being removed.

Chewing gum compositions, using the polymers of the present invention, as the base material, can be readily formulated by adding to the polymers such sweetening agents as corn syrup, honey, levulose, powdered cane sugar, saccharin and the like in combination with such flavoring agents as licorice, peppermint, spearmint, vanilla, wintergreen and the like. A typical chewing gum composition is noted in the table which follows with the total being 100 parts by weight.

| Ingredient: | Amounts in parts by weight |
|---|---|
| Chewing gum base | 20–30 |
| Powdered cane sugar | 40–60 |
| Corn syrup | 15–25 |
| Flavoring | 0–5 |

Chewing gum compositions can be compounded by standard procedures to a homogeneous mass which constitutes the chewing gum. It is to be understood that chicle and other natural gums can also be added to the chewing gums of the present invention, if so desired.

The following examples further illustrate the present invention and are not intended to limit the scope thereof in any manner.

EXAMPLE I

This example illustrates the excellent properties of a copolymer of vinyl acetate and ethylene of this invention as compared to polyvinyl acetate.

(a) Preparation of a copolymer of vinyl acetate and ethylene.—A mixture of 57 parts by weight vinyl acetate, 38 parts by weight acetone, 5 parts by weight ethylene and 0.10 part by weight di-tert-butyl peroxide was fed into a stainless steel tubular reactor which had a capacity of 500 milliliters and an outside diameter of ¼ of an inch. The reactor was then sealed under a pressure of 300 p.s.i.g. and placed in an oil bath which was at a temperature of 160° C. The sealed reactor was allowed to remain in the oil bath for 30 minutes, removed therefrom, opened and the hot, viscous contents thereof pumped into a twin-screw Marshall mill wherein the copolymer was separated from the liquids by drying at a temperature of 110° C. and under a pressure of 15 mm. of Hg. A conversion of 80 percent by weight of monomers to polymer was effected.

The copolymer of vinyl acetate and ethylene so produced contained 5.5 percent by weight combined ethylene, 94.5 percent by weight combined vinyl acetate and was tasteless and odorless. Determination of combined monomers was made according to the procedure described in Union Carbide's publication entitled "Standard Testing Method, No. WC–295–A," published Oct. 28, 1960. The copolymer was a clear solid at room temperature, about 23° C., and was soft, pliable and readily chewable at body temperature, about 350 C.

(b) Preparation of polyvinyl acetate.—Polyvinyl acetate was prepared in a manner as described for the preparation of the copolymer of vinyl acetate and ethylene in (a) using as the reaction mixture 60 parts by weight vinyl acetate, 40 parts by weight acetone and 0.10 part by weight di-tert-butyl peroxide and with the exception that the reaction mixture was kept under a pressure of 200 p.s.i.g. during the polymerization reaction. A conversion of 83 percent by weight monomers to polymer was effected.

The polyvinyl acetate was brittle and difficult to chew.

A comparison of the properties of the copolymer of vinyl acetate and ethylene and the polyvinyl acetate can be obtained from the data which is noted below.

| Property | Polyvinyl acetate | Copolymer of vinyl acetate and ethylene |
|---|---|---|
| Solids content, percent | 99.7 | 99.8 |
| Grade | 1.6 | 1.5 |
| Intrinsic viscosity | 0.092 | 0.086 |
| Plasticity, mm | 2.11 | 0.74 |
| Hydration time, minutes | 15.0 | 5.0 |

As can be seen from the data above, the copolymer of vinyl acetate and ethylene was softer and easier to chew than was the polyvinyl acetate.

Solids content noted in this and subsequent examples was determined by weighing a 2±0.001 gram sample into a tared aluminum dish. The dish was heated in a vacuum oven at 26 inches of mercury pressure and at a temperature of 160° C. for 2 hours, removed, cooled and weighed again. Solids content was calculated using the equation:

$$\text{Percent solids content} = \frac{\text{weight of residue}}{\text{weight of sample}} \times 100$$

EXAMPLE II

A copolymer of vinyl acetate and ethylene containing 8.3 percent by weight combined ethylene was prepared in a manner as described in Example I(a) using as the reaction mixture 54 parts by weight vinyl acetate, 36 parts by weight acetone, 10 parts by weight ethylene and 0.10 part by weight di-tert-butyl peroxide and with the exception that the reaction mixture was kept under a pressure of 500 p.s.i.g. during the polymerization reaction. A conversion of 75 percent by weight monomers to copolymer was effected. Properties of the copolymer are tabulated below.

Solids content, percent _____ 99.8
Grade _____ 1.5
Intrinsic viscosity _____ 0.085
Plasticity, mm. _____ 0.59
Hydration time, minutes _____ 4.0

EXAMPLE III

A terpolymer of vinyl acetate, vinyl stearate and ethylene containing 90.7 percent by weight combined vinyl acetate, 5.8 percent by weight combined vinyl stearate and 3.5 percent by weight combined ethylene was prepared in a manner as described in Example I(a) using the reaction mixture 94 parts by weight vinyl acetate, 6 parts by weight vinyl stearate, 5 parts by weight ethylene, 70 parts by weight acetone and 0.17 part by weight di-tert-butyl peroxide and with the exception that the mixture was kept under a pressure of 350 p.s.i.g. during the polymerization reaction. A conversion of 80 percent by weight monomers to the terpolymer was effected. Properties of the terpolymer are tabulated below.

Solids content, percent _____ 99.8
Grade _____ 1.59
Intrinsic viscosity _____ 0.088
Plasticity, mm. _____ 0.76
Hydration time, minutes _____ 5.0

Combined monomer content in this example and in subsequent examples was determined by the method previously referred to.

EXAMPLE IV

A terpolymer of vinyl acetate, vinyl stearate and ethylene containing 92.7 percent by weight combined vinyl acetate, 3.8 percent by weight combined vinyl stearate and 3.5 percent by weight combined ethylene was prepared in a manner as described in Example I(a) using as the reaction mixture 96 parts by weight vinyl acetate, 4 parts by weight vinyl stearate, 5 parts by weight ethylene, 70 parts by weight acetone and 0.17 part by weight di-tert-butyl peroxide and with the exception that the reaction mixture was kept under a pressure of 350 p.s.i.g. during polymerization reaction. A conversion of 80 percent by weight monomers to the terpolymer was effected. Properties of the terpolymer are tabulated below.

Solids content, percent _____ 99.8
Grade _____ 1.59
Intrinsic viscosity _____ 0.088
Plasticity, mm. _____ 0.80
Hydration time, minutes _____ 5.0

The terpolymers of Examples III and IV exhibited even better lubricity and showed even less tendency of sticking to the teeth of the chewer than the copolymers of Examples I and II.

EXAMPLE V

A copolymer of vinyl acetate and ethylene containing 8.5 percent by weight combined ethylene was prepared in a manner as described in Example I(a) using as the reaction mixture 39 parts by weight vinyl acetate, 57 parts by weight acetone, 3.8 parts by weight ethylene and 0.15 part by weight di-acetyl peroxide and with the exception that the reaction mixture was kept under a pressure of 350 p.s.i.g. and a temperature of 95° C. during the polymerization reaction. A conversion of 60 percent by weight monomers to copolymer was effected. Properties of the copolymer are tabulated below.

Solids content, percent _____ 99.9
Grade _____ 1.6
Intrinsic viscosity _____ 0.084
Plasticity, mm. _____ 0.36
Hydration time, minutes _____ 5.0

EXAMPLE VI

A copolymer of vinyl acetate and ethylene containing 27.9 percent by weight combined ethylene was prepared using as the reaction mixture 75 parts by weight vinyl acetate, 25 parts by weight ethylene, 70 parts by weight acetone and 0.03 part by weight di-tert-butyl peroxide and conducting the reaction at 110° C. The properties of the copolymer are tabulated below.

Solids content, percent _____ 99.8
Grade _____ 9.70
Plasticity, mm. _____ 1.00
Hydration time, minutes _____ 10.0
Intrinsic viscosity _____ 0.513
Melt viscosity, ° C. _____ 700/71
Melt index _____ 131.5

The following example illustrates the excellence as a chewing gum base of blends of vinyl acetate-ethylene copolymers.

EXAMPLE VII

A mixture of 50 parts by weight of a vinyl acetate-ethylene copolymer containing 55 percent by weight combined ethylene and 65 parts by weight of a vinyl acetate-ethylene copolymer containing 27.9 percent by weight combined ethylene was blended in a Brabender Plastograph to produce a blend containing about 40 percent by weight total ethylene. The properties of the blend are tabulated below.

Solids content _____ 99
Grade _____ 10.9
Intrinsic viscosity _____ 0.49
Plasticity, mm. _____ 1.1
Hydration time, minutes _____ 15
Melt index _____ 6.30
Melt viscosity, ° C. _____ 580/80

The following example illustrates the excellence as a chewing gum base of blends of vinyl acetate-ethylene copolymers and polyvinyl acetate.

EXAMPLE VIII

A mixture of 50 parts by weight of the vinyl acetate-ethylene copolymer of Example VI (27.9 percent by weight combined ethylene) and 50 parts by weight of polyvinyl acetate was blended in a Brabender plastograph to produce a blend containing about 14 percent by weight total ethylene. The blend was pliable and possessed excellent chewing properties. The properties of the blend are tabulated below.

| | |
|---|---|
| Solids content, percent | 99 |
| Grade | 4.80 |
| Intrinsic viscosity | 0.310 |
| Plasticity, mm. | 1.40 |
| Hydration time, minutes | 5.0 |
| Melt index, dg./min. | 6.1 |
| Melt viscosity, m./gm./sec., °C. | 510/82 |

EXAMPLE IX

Compositions, whose formulations are noted below, were compounded to a homogeneous mass constituting chewing gums of excellent quality.

| | Parts by weight |
|---|---|
| Composition A: | |
| Copolymer of Example I | 25 |
| Corn syrup | 25 |
| Powdered cane sugar | 48 |
| Peppermint oil | 2 |
| Composition B: | |
| Terpolymer of Example IV | 30 |
| Corn syrup | 20 |
| Powdered cane sugar | 48 |
| Peppermint oil | 2 |
| Composition C: | |
| Blend of copolymer of Example V and vinyl acetate homopolymer 50:50 | 30 |
| Corn syrup | 20 |
| Powdered cane sugar | 48 |
| Peppermint oil | 2 |
| Composition D: | |
| Blend of copolymer of Example VI and vinyl acetate homopolymer 50:50 | 30 |
| Corn syrup | 20 |
| Powdered cane sugar | 48 |
| Peppermint oil | 2 |

We claim:

1. A chewing gum containing conventional chewing gum ingredients and, as a base material, an effective amount of a polymer selected from the group consisting of (a) a copolymer of vinyl acetate and ethylene containing from about 1 to about 40 percent by weight combined ethylene, based on the weight of said copolymer, and (b) a terpolymer of vinyl acetate, ethylene, and an ester having the formula (I)
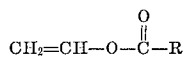

wherein R is a monovalent hydrocarbon radical containing from 8 to 22 carbon atoms inclusive, said terpolymer containing from about 1 to about 40 percent by weight combined ethylene and from about 1 to about 15 percent by weight combined ester (I), said percent by weight based on the weight of said terpolymer; and each of said polymers having a grade of from about 1.2 to about 20, an intrinsic viscosity of from about 0.05 to about 0.75, and a plasticity of from about 0.03 to about 2.7.

2. A chewing gum as defined in claim 1 wherein said polymer is a copolymer of vinyl acetate and ethylene.

3. A chewing gum as defined in claim 2 wherein the combined ethylene is present in an amount of from about 1 to about 20 percent by weight based on the weight of the copolymer.

4. A chewing gum as defined in claim 1 wherein each of the polymers (a) and (b) have a melt viscosity of from about 500 to 650 at 65° C. to about 650 to 800 at 90° C. and a melt index of from about 3 to about 150.

5. A chewing gum as defined in claim 1 wherein the polymer is a terpolymer of vinyl acetate, ethylene, and an ester (I).

6. A chewing gum as defined in claim 5 wherein the combined ethylene is present in an amount of from about 1 to about 20 percent by weight and the combined ester (I) is present in an amount of from about 3 to about 7 percent by weight based on the weight of the terpolymer.

7. A chewing gum as defined in claim 1 wherein the ester (I) is vinyl stearate.

References Cited

UNITED STATES PATENTS

| | | | |
|---|---|---|---|
| 2,596,852 | 5/1952 | Geggie | 99—135 |
| 2,662,016 | 12/1953 | Merz et al. | 99—135 |
| 3,018,274 | 1/1962 | Buselli et al. | 99—135 X |
| 3,311,595 | 3/1967 | Kahrs et al. | 99—135 X |

RAYMOND N. JONES, *Primary Examiner.*

S. E. HEYMAN, *Assistant Examiner.*

U.S. Cl. X.R.

260—80.6